April 20, 1937.  F. L. BUENGER  2,077,394
LIQUID SEALED PUMP
Filed May 28, 1934
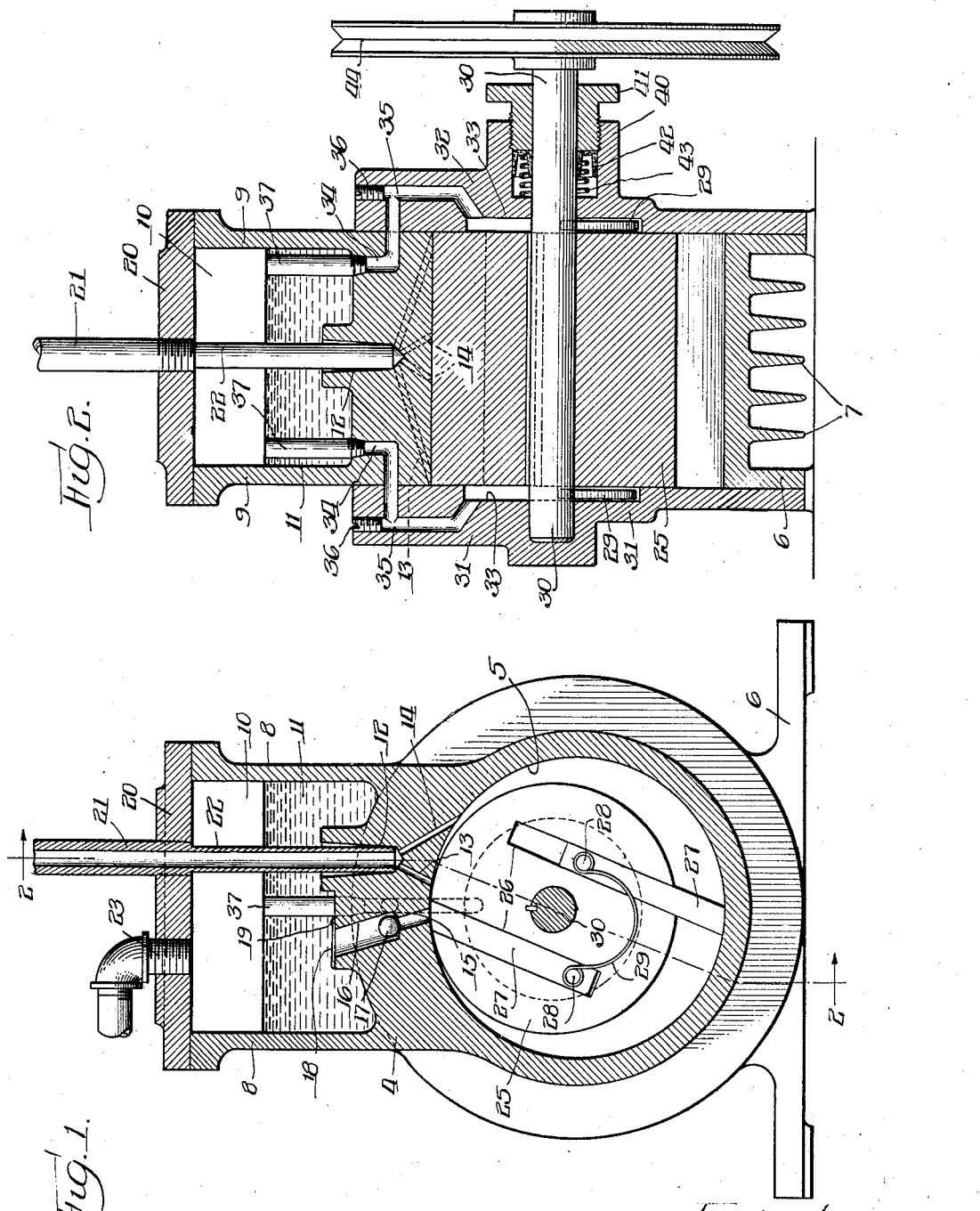
Inventor:
Frederick L. Buenger
By: Kent W. Wonnell
Atty.

Patented Apr. 20, 1937

2,077,394

UNITED STATES PATENT OFFICE 2,077,394

LIQUID SEALED PUMP

Frederick L. Buenger, Chicago, Ill., assignor of one-half to Arthur C. Johnson, Chicago, Ill.

Application May 28, 1934, Serial No. 727,860

5 Claims. (Cl. 230—205)

This invention relates to vacuum and pressure pumps of a type sealed by liquid and has more particular reference to pressure and vacuum pumps with an oil sealing reservoir incorporated as a part thereof.

An important object of this invention is in the provision of a liquid containing chamber which forms a seal for the pump for producing either a high pressure or a vacuum. A further object of the invention is to incorporate a liquid sealing chamber as an integral part of the pump itself to reduce leakage of pressure, to reduce loss of the sealing liquid, and to reduce the amount of liquid which is necessary to effectively seal the pump.

A still further object of the invention is in the provision of means for preventing the sealing liquid or any large part thereof, from flowing into the pump chamber under any condition.

A further object of the invention is in the provision of spring yokes connected to opposite pumping vanes with recesses in the end plates for containing the spring yokes.

A further object of the invention is in the provision of a lubricating passage from the sealing chamber to the recess in the end plate for lubricating the spring yokes at both ends of the pump rotor.

Other objects of the invention are in the provision of an improved seal surrounding the shaft in the packing gland; to provide cooling vanes for the pump; to provide a combined taper and screw fit for the air inlet; to provide a pressure chamber and an improved seal therefor; and in general to produce the construction herein shown and described.

In the accompanying drawing,

Fig. 1 is a transverse sectional view of a pump constructed in accordance with this invention; and Fig. 2 is a section taken on the line 2—2 of Fig. 1.

In providing a sealed pump for high pressure or vacuum it has been the practice to substantially surround the pump mechanism with a chamber containing liquid, usually oil, which acts as a seal for the pump and its movable parts. Such a construction is not only bulky and cumbersome but also it is heavy, requires too much oil, and is liable to admit an objectionable quantity of oil to the pump chamber so that when the pump is first started after being idle, the presence of the sealing liquid may cause a breakage of the parts.

The present invention overcomes these objections by providing a sealing liquid and pressure chamber formed as an integral part of the stationary member of the pump with a passage leading therefrom to the communicating recesses at the ends of the rotor for lubricating the pump vanes, sealing them, and forcing them outwardly under pressure.

Referring now more particularly to the drawing, a pump casing member 4 has a horizontal cylinder or bore 5 open at the ends, a supporting base and intermediate cooling ribs 7. Above the cylinder 5 are integral walls 8 and 9 forming a chamber 10 for a sealing liquid 11 and providing a pressure space above the liquid.

In the wall between the cylinder bore 5 and the chamber 10 is an inlet passage 12 slightly tapered toward its lower end and having passages 13 and 14 leading from the lower end thereof into the cylinder bore 5. An outlet passage 15 through this wall has an outer enlargement 16 forming a seat in the passage for receiving a ball 17 which acts as a valve therein and across the upper or discharge end of this passage is a retainer 18 which may be a flap valve secured at one side for a fastening screw 19 or it may be simply a narrow strap extending across the passage to prevent the ball 17 from dislodgment from the passage.

Secured to the top of the walls 8 and 9 is a cover 20 through which is threaded a pipe 21 to make a fluid-tight joint therewith, the pipe having a reduced extension 22 with an extremity adapted to fit tightly in the tapered opening 12 and to make a fluid-tight joint therewith when the cover is tightly secured in place. Also extending through the cover 20 is a fitting 23 for transferring the pressure therefrom. If the pump is to be used for pressure a connection is made with the fitting 23 and if it is to be used for suction a connection is made with the pipe 21.

Mounted eccentrically in the cylinder 5 is a rotor 25 having parallel slots 26 extending oppositely and at an angle from the opposite faces of the rotor. These slots extend to the ends of the rotor which fits tightly against the wall of the cylinder between the inlet and outlet openings 13 and 15. In the slots 26 are vanes 27 having outer covered ends which engage the inner surface of the cylinder bore 5 and make a tight contact therewith for the full length of the rotor. At the ends of the vanes are projections 28, the corresponding ends each connected by a tension spring yoke 29 which extends beyond that end of the rotor. These spring yokes tend to force the vanes outwardly at all times so that there is no difficulty in providing pressure or suction from the very start of the pump and the vanes do not tend to stick in the recesses even at low speed. At high speed and high pressure or vacuum there is no difficulty in keeping the vanes outwardly as they are both drawn and forced outwardly in their slots by the pumping and rotary movements.

The rotor 25 is keyed to a shaft 30 which extends beyond the ends thereof and is seated at one end by a plate 31 into which it extends, and extends through a plate 32 at the other end. These plates are formed with recesses 33 in which the spring yokes 29 are movable.

Either one or both of the openings 33 is connected to the pressure chamber 10 by providing an angular passage 34 from the bottom of the chamber 10, extending outwardly at the side of the pump member 4 and communicating with a passage 35 in the plate 31 or 32 leading to the recess 33. In forming this passage 35 the portions thereof are either cast or drilled in the plate 31 or 32 and a screw plug 36 may be inserted in the exposed end of one of the portions for sealing it but permitting access thereto, if desired, by removing the plug. Extending upwardly in the pressure chamber 10 from the opening 34 is a short pipe 37 which determines the level of the oil 11 in the chamber and also prevents the passage of any considerable portion of the sealing liquid 11 from the chamber 10 through the passages 34 and 35. It is desirable to lubricate the vanes 27 and to admit the pressure from the top of the chamber 10 to the space back of the vanes 27 in the recesses 26 in the normal operation of the pump. Some space is always provided between the inner end of a vane 27 and its recess 26 to afford a transfer of pressure through the rotor to the recesses 33 at the ends thereof so that the pressure applied to the vanes will be uniform and continuous and a passage will always be afforded for the lubrication of the vanes throughout their length.

When the pump is in operation the sealing liquid will be more or less agitated in the chamber 10 by the passage of air from the discharge opening therethrough which will cause a portion of the sealing liquid to pass downwardly through the tube 37 and the passages 34 and 35. When the pump is at rest the tube 37 will determine the height of liquid in the chamber 10 but will insure that the sealing liquid is retained therein rather than allow it to flow downwardly into the pump cylinder, thereby insuring a sufficient seal for starting, preventing the liquid from accumulating in the pump chamber and breaking or damaging the parts in starting, and limiting the amount of sealing liquid that can flow from the chamber to that which is above the level of the opening of the pipe 37.

In the outer side of the end plate 32 is a packing gland 40 and a gland nut 41 threaded therein. Within the packing chamber is a channel shaped gasket 42 preferably with thin edges engaging the shaft 30 and the sides of the packing gland and having a resilient material or a spring 43 disposed to press the packing against the nut 41 so that it is compressed and forced outwardly to tighten the packing joint when the nut 41 is moved inwardly.

At the outer end of the shaft is a grooved pulley 44 by which the shaft and the pump rotor are operated.

In this construction the rotation of the shaft 30 and the rotor causes the vanes 27 to engage the eccentric surface of the cylinder bore 5 and the movement of the vanes is effected by the springs 29 and by the pressure admitted in the slots 27 from the recesses 33 at the ends of the rotor. The sealing liquid lubricates the pump and prevents the admission of air, thereby forming an efficient pump for creating both vacuum and pressure. If only a vacuum is desired the cover 20 may be dispensed with and if only pressure is desired the pipe 21 may communicate only with the atmosphere. Any small leakage from the pressure chamber to the pump cylinder will not greatly affect the operation of the pump as the surplus liquid will simply be returned to the pressure chamber, but such leakage might injure the pump in starting.

I claim:

1. A liquid sealed pump comprising a unitary casing having a lower rotor opening and a liquid receiving chamber above it with passages directly between the opening and the chamber, a pair of end plates directly attached to the casing to close the rotor opening having apertures to form end bearings, a vaned rotor for the casing having a shaft mounted in the bearings, means forming a valve in one of the passages to admit pressure from the rotor to the chamber, a tight cover for the top of the chamber having a pipe extending through it and the chamber and into another opening between the chamber and the rotor opening, the chamber being adapted to contain a sealing liquid through which the said pipe extends.

2. A liquid sealed pump structure in accordance with claim 1 in which the pipe has a threaded fluid-tight connection through the cover and has a reduced extremity to fit tightly into the opening at the bottom of the chamber to make a fluid-tight connection therewith so that air is conducted in the pipe through the closed pressure chamber and into the rotor casing.

3. A liquid sealed pump structure in accordance with claim 1 in which the pipe has a fluid-tight threaded connection through the cover and a reduced extremity and the opening between the chamber and the casing into which the extremity of the pipe fits is tapered so that the end of the pipe fits tightly therein, the pipe being removable from the tapered opening with the cover without unthreading it therefrom.

4. A liquid sealed pump structure in accordance with claim 1, in which both of the directly attached end plates are provided with passages and the casing has corresponding passages connected therewith leading to the chamber therein for conducting the sealing liquid through the end plates to the ends of the rotor and to the inside edges of the vanes movable in the rotor.

5. A liquid sealed pump structure in accordance with claim 1, in which the attached end plates and the casing have corresponding passages for a sealing liquid from the chamber to the axis of the rotor and to the ends of the pump vanes, and stand pipes in the chamber connected to the chamber ends of the passages for limiting the amount of sealing liquid which flows through the passages.

FREDERICK L. BUENGER.